Dec. 1, 1931. G. WEBER 1,834,753
APPARATUS FOR SUPPLYING GAS FOR BLOWPIPE WORK
Filed May 6, 1930
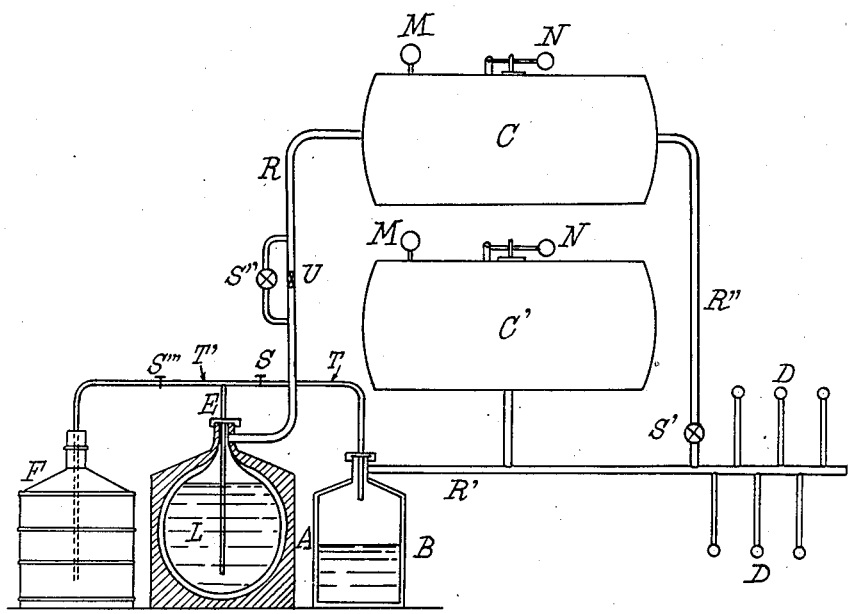
INVENTOR
GUILLAUME WEBER
BY: Ruege, Boyce v Bakelor
ATTORNEYS.

Patented Dec. 1, 1931

1,834,753

UNITED STATES PATENT OFFICE

GUILLAUME WEBER, OF HAYANGE, FRANCE, ASSIGNOR TO LES PETITS FILS DE FRANCOIS DE WENDEL, OF PARIS, FRANCE

APPARATUS FOR SUPPLYING GAS FOR BLOWPIPE WORK

Application filed May 6, 1930, Serial No. 450,301, and in France June 7, 1929.

The invention relates to an improved plant for the supply of welding or cutting outfits with oxygen and other gases.

In a known method for the supply of oxygen or other gas to outfits for autogenous welding, blowpipe cutting, or the like, the oxygen is conveyed in the liquid state to a point near the working outfit, the liquid is evaporated at this place and the resulting gas supplied directly to said working outfit, or to intermediate gas tanks or tubes.

The vaporizing receptacles are adapted for the evaporation of the liquid in a relatively short time, and hence they cannot be employed for the preservation of the liquid for a long period of time, so that it is necessary to frequently renew the contents of the vaporizing receptacles, thus causing repeated manipulations and transfers of the liquefied gas and subsequent losses during the refilling.

The present invention has for its object to obviate such drawbacks and it is chiefly characterized in that it comprises one or more heat-insulated receptacles so arranged as to provide for the storage of a greater or less amount of liquefied gas, and for the transfer of said liquid into a stationary or movable vaporizing apparatus, at the proper time and without loss of gas, said receptacle or receptacles being connected to said vaporizing apparatus, and preferably to a gas tank adapted to receive the vapours given off by the liquid when the plant is inoperative.

The accompanying drawing shows by way of example a plant according to the invention which comprises a tank for preservation or storage of liquid air.

The plant herein represented comprises a storage vessel A with double walls forming a jacket in which a vacuum has been made, and adapted to withstand a pressure exceeding 10 atmospheres. Said vessel is connected by the tube T to a vaporizing apparatus B, comprising an electric or other heating device, and by the pipe R to the gas tank C. A check valve or a cock U is provided in the pipe R to prevent all flow of vapour from the tank C to the vessel A when the latter is being filled or when a filled vessel is being substituted for an empty vessel.

The vaporizing apparatus B is connected to the working out-fits D and to the gas tank C by respective pipes R' and R", cocks or check valves S, S' being mounted on the pipes T—R". The plant may optionally comprise an intermediate tank C' adapted to contain an additional amount of gas. A pressure gauge M and a safety valve N are mounted on each of the tanks C and C'.

The capacity of tanks C and C' is selected in relation with that of vessel A.

The operation is as follows: After vessel A has been filled or after a filled vessel has been substituted for an empty one, said vessel A, containing the liquefied gas L, is closed by the cover E, cock S is opened and cock S' is closed. The gas disengaged by the evaporation of the liquid L in vessel A exercises a pressure upon the liquid which is thus forced through tube T into the vaporizing apparatus B, as long as the pressure of the gas in the apparatus B, tank C' and pipe R' is below the pressure of the gas in vessel A.

The liquid oxygen proceeding into vessel B is vaporized, and such evaporation may be furthered by electric or other heating means; the resulting gas is directly supplied to the working outfits D and also into tank C', which thus serves as a reserve supply adapted to regulate the pressure and the delivery.

If, by reason of a reduced consumption in the working outfits D, the pressure rises in vessel B and tank C' and tends to exceed the pressure in vessel A, a certain amount of gas will flow from B to A, and the bubbling of the gas will cause a more rapid evaporation of the liquid in A, whereby the pressures between A and B will be balanced. Hence, the pressure in vessel B or in tank C' can never exceed the pressure in vessel A or in tank C. When the consumption of the gas withdrawn becomes again normal, the pressure falls in B, and the liquid resumes its normal flow from A to B.

In this manner, the liquid can be transferred from the storage vessel to the vaporizing apparatus without any loss of gas.

When vessel A is emptied, it can be readily removed after closing valve S, and a filled vessel may be substituted therefor. During this time, even if the vaporizing vessel B contains no liquid, the working outfits D may continue to operate, due to the reserve supply of gas which is stored up in tank C'.

Check valve U prevents the gas from returning from tank C to storage vessel A when liquid is being again supplied or while the vessel is being replaced.

When the plant is stopped for a time exceeding several hours, it is desirable, in order to prevent the pressure from increasing to an excessive value in vessel C, by the continuous evaporation of the liquor in A, to open valve S', so as to set the two tanks C and C' in communication with one another. In this event, valve S need not be closed, since the gas pressure remains constantly equal in A and in B, and no liquid flows from A to B.

For the automatic restarting of the plant after it has been stopped, it will be sufficient to open valve S, or to leave said valve open and to close valve S'.

A modification of the invention consists in the provision of a by-pass arrangement in parallel with check valve U and provided with a cock S''; by opening cock S'', it is possible to further the starting of the plant by using the pressure in tank C for more rapidly initiating the flow of liquid from A to B.

As shown in the drawing, the siphon may be extended by a bent tube T' provided with a cock S''' and permitting at all times, after closing cock S, to transfer the liquid from the bottle A to a transfer vessel or to a portable vaporizing apparatus.

The vaporizing apparatus may obviously be portable or movable.

Obviously, the invention is not limited to the embodiment herein described and represented, this being given solely by way of example.

Having now described my invention, what I claim as new and desire to secure by Letters Patent is:

1. A plant for the supply of a gas from a source of liquefied gas to a working apparatus comprising a heat-insulated liquefied gas vessel, a vaporizing apparatus, means for transferring liquid from said vessel to said vaporizing apparatus, a connection between said vaporizing apparatus and the working outfit, a gas tank, a connection between said gas tank and the top of said vessel, a connection between said gas tank and the outlet of said vaporizing apparatus, and an obturating member on said last mentioned connection and adapted either to close the outlet of said gas tank and to permit the pressure to rise in the latter, for automatically furthering the transfer of the liquid, or to open said outlet whereby the pressures are balanced throughout the whole plant.

2. In a plant as claimed in claim 1, an intermediate gas tank, and a direct connection between said intermediate gas tank and said vaporizing apparatus, whereby said intermediate gas tank is adapted to store up gas at a lower pressure than in said storage vessel.

3. In a plant as claimed in claim 1, a check valve in the connection between the top of said storage vessel and said gas tank.

4. In a plant, as claimed in claim 1, a check valve in the connection between the top of said storage vessel and said gas tank, a by-pass arrangement in parallel with said check valve, and a cock on said by-pass.

In testimony whereof I have signed my name to this specification.

GUILLAUME WEBER.